United States Patent [19]

Nicot

[11] Patent Number: 6,098,469
[45] Date of Patent: Aug. 8, 2000

[54] DYNAMOMETRIC DETECTOR DEVICE AND METHOD FOR BEARINGS

[75] Inventor: Christophe Nicot, Epagny, France

[73] Assignee: SNR Roulements, Annecy, France

[21] Appl. No.: 08/983,140

[22] PCT Filed: Jun. 28, 1996

[86] PCT No.: PCT/FR96/01004

§ 371 Date: Jan. 21, 1998

§ 102(e) Date: Jan. 21, 1998

[87] PCT Pub. No.: WO97/04295

PCT Pub. Date: Feb. 6, 1997

[30] Foreign Application Priority Data

Jul. 21, 1995 [FR] France .................................. 95 08870

[51] Int. Cl.[7] ..................................................... G01L 5/00
[52] U.S. Cl. ............................................................. 73/862.55
[58] Field of Search ............................... 73/862.55; 29/606

[56] References Cited

U.S. PATENT DOCUMENTS 4,138,783  2/1979  Portier .......................................... 29/606

*Primary Examiner*—Max Noori
*Assistant Examiner*—Jewel Thompson
*Attorney, Agent, or Firm*—Oblon, Spivak, McClelland, Maier & Neustadt, P.C.

[57] ABSTRACT

Dynamometric detector device for bearings, with a strain transmitter fitted integral with a race and supporting a sensor. The strain transmitter and sensor support means includes the armature (7) of the bearing seal (8) and has a cylindrical bearing surface (11) mounted on a fixed race (1) of the bearing and extended radially by a disk-shaped element (13) supporting a sealing lip of the seal (8).

5 Claims, 5 Drawing Sheets

DYNAMOMETRIC DETECTOR DEVICE AND METHOD FOR BEARINGS

BACKGROUND OF THE INVENTION

The invention concerns a dynamometric detector device and method for bearings, which applies a means of transmitting stresses integral with a bearing ring and ensures connection with a sensor means.

FIELD OF THE INVENTION

Patent FR-A-2125926 describes a bearing in which a ring carries strain gages and is provided with a fitted sleeve which carries the means of connection of a connecting cable from said gages to a measuring apparatus.

Mounting of such strain gages on the bearing necessitates prior machining of the ring. Therefore, the dynamometric detector device cannot equip a bearing not containing such machining, such as a mass-produced bearing.

SUMMARY OF THE INVENTION

According to the invention, the means transmitting stress and supporting the sensor means consists of the frame of the gasket of the bearing, in which a cylindrical bearing surface of mounting on a stationary bearing ring is extended radially by a support disk of a sealing lip of said gasket.

The device thus formed is advantageously fastened to the support frame of a removable gasket. Consequently, the device can be mounted on different types of bearings without prior modification of the components of the bearing.

The bearing equipped with a gasket carrying the detector device according to the invention therefore possesses standardized dimensional characteristics which allow its integration in existing application assemblies.

BRIEF DESCRIPTION OF THE DRAWINGS

Other characteristics and advantages of the invention will appear on reading the specification of working examples of the dynamometric detector device, with reference to the attached drawing on which:

FIG. 4 is a perspective of the frame represented on FIG. 3, supporting the detector device and the gasket.

DESCRIPTION OF THE PREFERRED EMBODIMENTS

Figure 1:
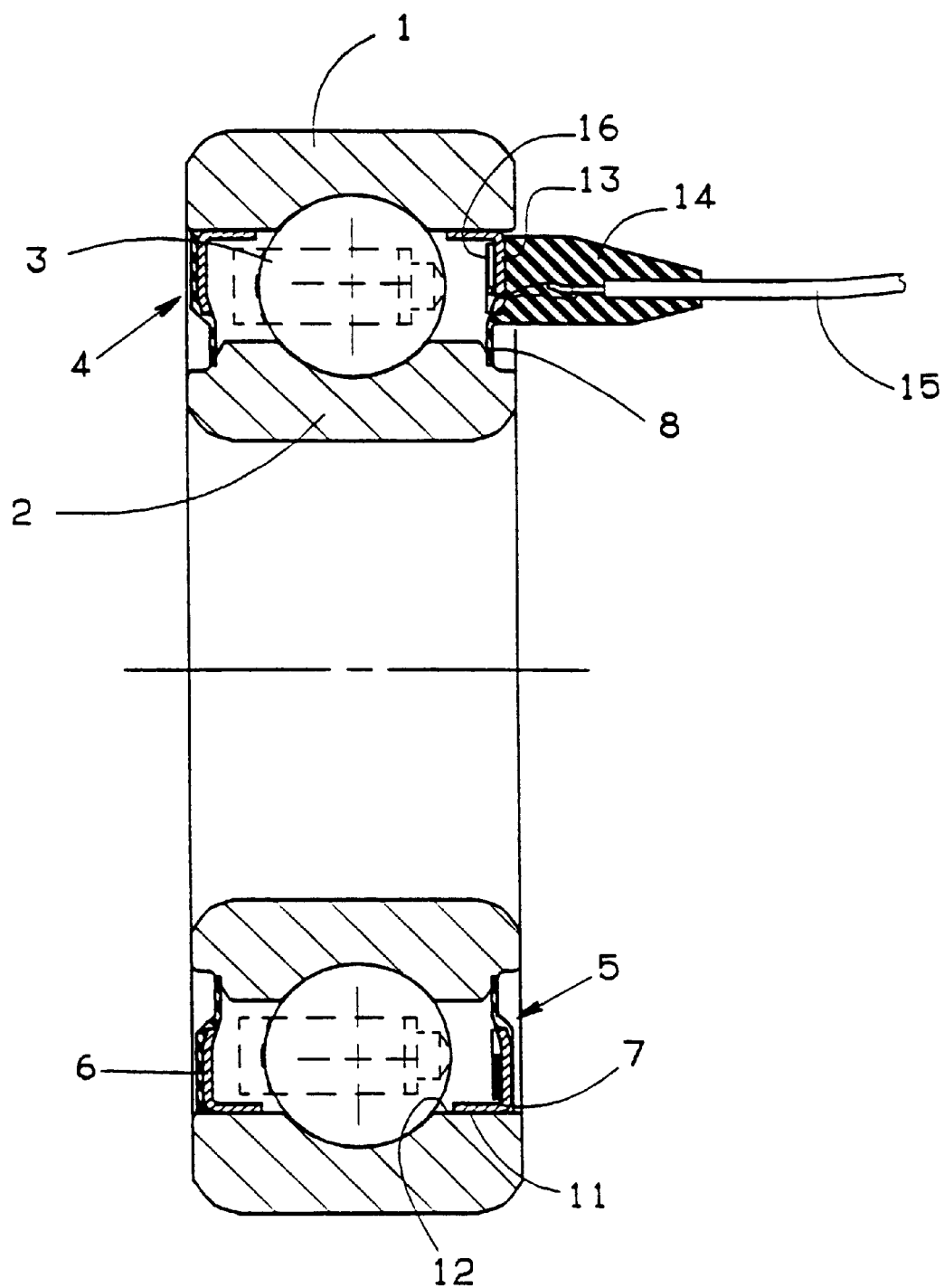
FIG. 1 is a radial section of a bearing equipped with the dynamometric detector device mounted on a gasket with radial lip.

FIG. 1 represents a bearing consisting mainly of a stationary outer ring 1, a rotating inner ring 2 and rolling bodies 3 in contact with the bearing races carried by said rings 1, 2. Gaskets 4, 5 are carried by the outer ring and are located on both sides of the bearing race machined in said ring.

The gaskets 4 and 5 respectively possess a mounting support frame 6, 7. The frame, such as 6, possesses a cylindrical axial bearing surface.

The frame 7 on which the stress transmitting means is fastened possesses a cylindrical axial bearing surface 11 of mounting in contact with the bore 12 of the stationary ring 1 and a disk-shaped radial extension 13 supporting a sealing lip of the gasket 8.

The frame 7 also carries the head 14 of a connecting cable 15, a working example of which is described in patent EP-A-484195.

The transmitting means consists of a sensor element 16, sensitive to the deformations it undergoes.

Figure 2:
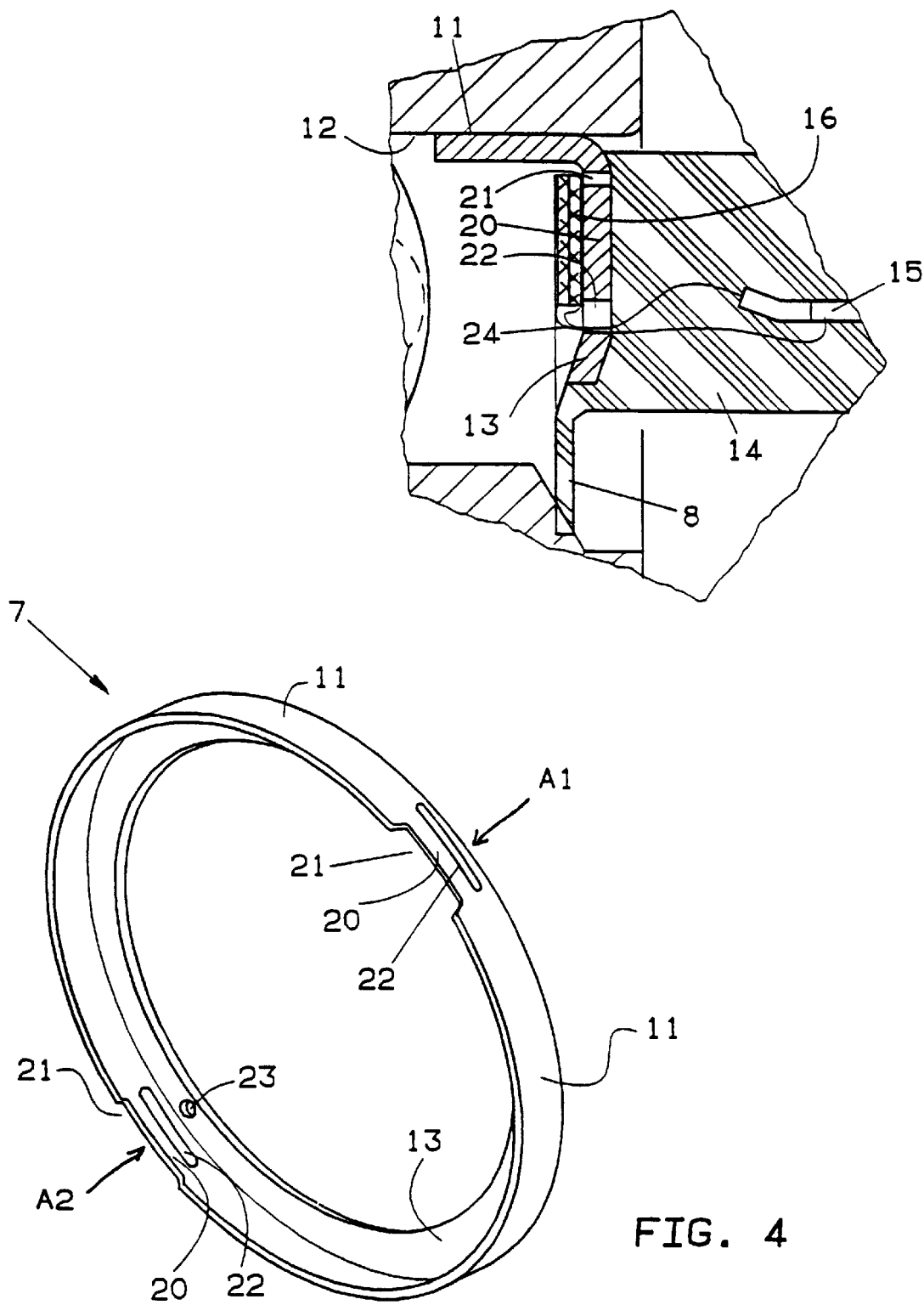
FIG. 2 is a view on a larger scale of the zone of mounting of the gasket represented on FIG. 1.
Figure 3:
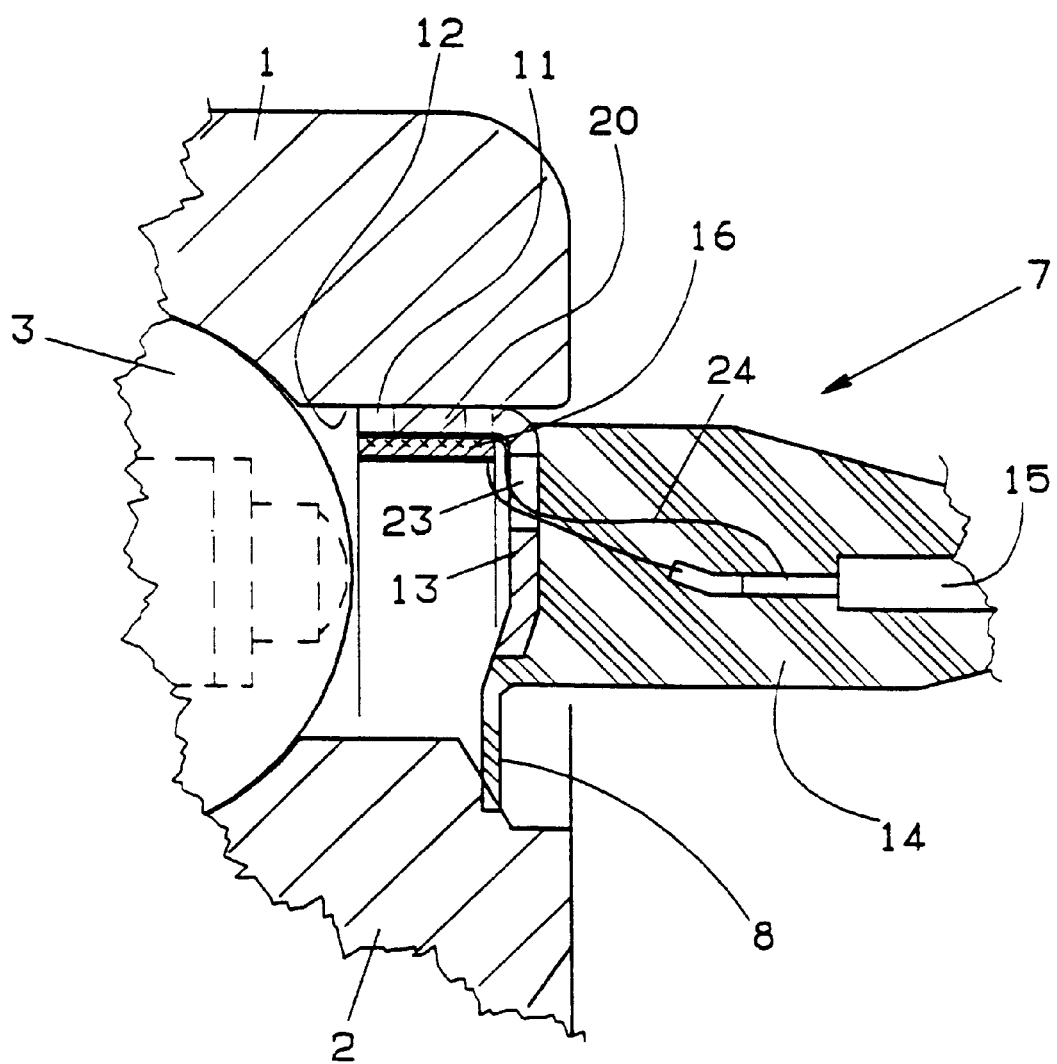
FIG. 3 is a view on a larger scale of the zone of mounting of the gasket equipped with a variant application of the dynamometric detector device.

By way of example, the stress sensor element consists of a piezoelectric or piezoresistive film placed on the cylindrical part 11 (FIG. 3) or on the support disk 13 (FIG. 2).

The sensor element 16 is fastened by any known means either on the free face of the axial bearing surface 11 (FIG. 3) or on one of the faces of the disk 13 (FIG. 2). The sensor element 16 can possibly be molded with the elastomer constituting the gasket 8.

FIG. 4 is a working example of the frame 7 and shows at least one elastically deformable $A_\chi(\chi=1)$ which possesses an increased sensitivity to deformation stresses. For that purpose, the $A_\chi$ zone is materialized by an elastic rod 20 consisting of a portion of the bearing surface 11 located between an axial notch 21 and a slot 22. The hole 23 ensuring passage of the conductors 24 joining the sensor element 16 to the head 14 of the connecting cable 15 is located in proximity to the rod 20 on the disk 13.

The device operates as follows:

When a force is applied on the roller bearing, the stresses are transmitted from one ring to the other by the rolling bodies 3, and the bearing rings 1, 2 undergo, in the zones of contact, deformations proportional to the stress applied. The deformations of the stationary ring in the bore 12 are transmitted to the frame 7 and in the stress sensor element 16.

When the turning ring 2 is rotated, the successive passage of the rolling bodies 3 in zones (FIG. 5) generates periodic deformations in the frame 7 and in the sensor element 16. The stress detector device supplies in that case a periodic electric signal (S).

The characteristics of the signal (S) vary, for example, with the stress applied on the bearing. The measurements are processed by the customary measurement chains, including a receiver, an amplifier and a signal processing system.

Figure 5:
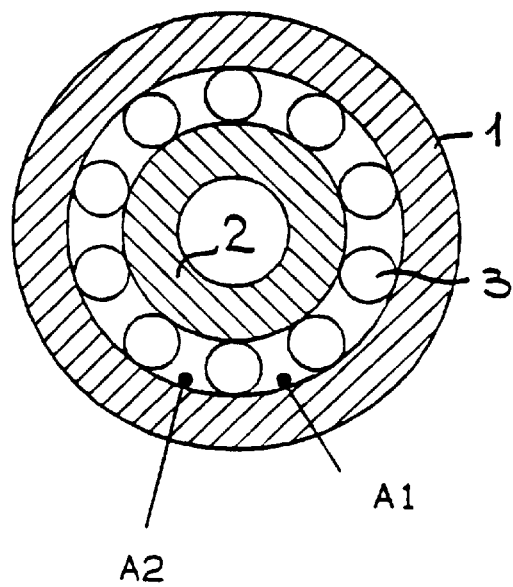
FIGS. 5 and 6 are schematic representations of a bearing and of the zones of mounting of the detector device.
Figure 7:
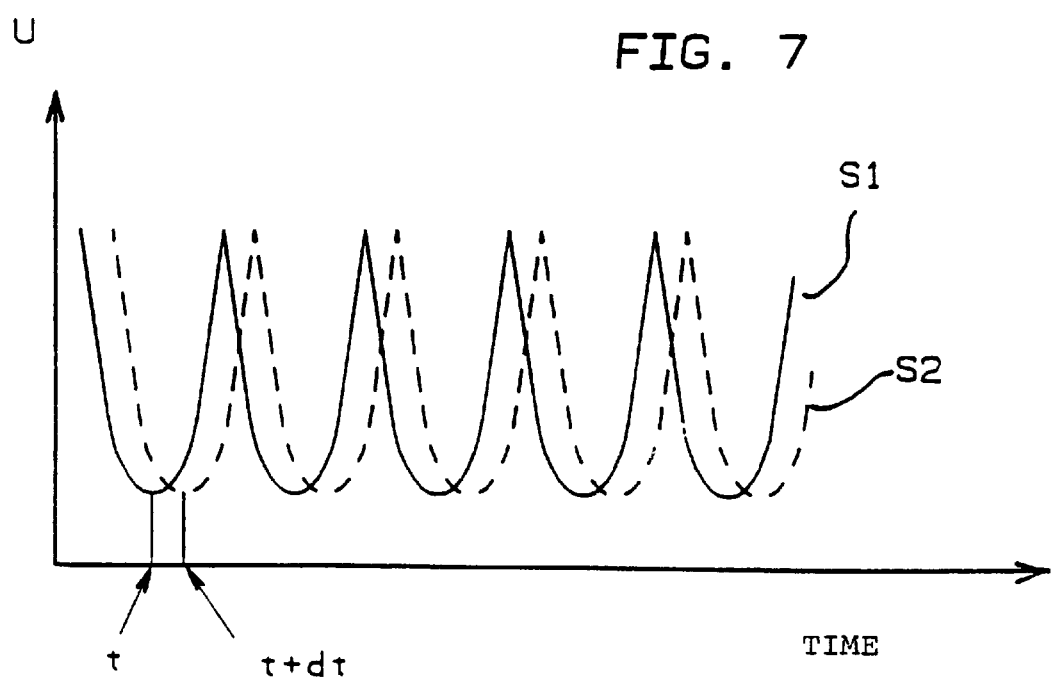
FIGS. 7 and 8 represent the diagram of variation of the signal depicting the load of the bearing as a function of time, with reference to the assemblies of the device represented on FIGS. 5 and 6 respectively.

Analysis of the electric signal (S) collected makes it possible to determine an amplitude $U_\chi$ of the signal, which corresponds to the deformation of zone $A_\chi$ proportional to the load applied on the bearing, and a characteristic frequency $\Omega$ which is linked mainly to the speed of rotation of the bearing and to the number of rolling bodies (FIG. 5).

$$\Omega = \frac{N}{2}\left(1 - \frac{D}{d}\cos(a)\right)\frac{Z}{60}$$

- $\Omega$    frequency of signal S
- N    speed of rotation of the shaft, in rpm
- D    diameter of the rolling bodies, in mm
- d    pitch diameter of the bearing, in mm
- Z    number of rolling bodies
- a    angle of contact between the bearing race and the rolling elements on the measurement site, in degrees In another case, it is necessary to increase the sensitivity of the force sensor device.

A first possibility consists of using a sensor element in the form of a film with several associated layers.

According to a variant of the device, the frame 7 possesses at least one deformable elastic localized zone $A_\chi$ (FIG. 4).

According to another embodiment of the process, the stress applied is measured in two zones of the ring 1. According to the working example of the device represented on FIGS. 5 and 6, signals S1 and S2 are determined in two zones of the frame 7, such as:

$$S_1 = f(U_1, t) \text{ and } S_2 = f(U_2, t + dt)$$

$U_1$ is the amplitude of signal $S_1$ in zone $A_1$ $U_2$ is the amplitude of signal $S_2$ in zone $A_2$ t is the time dt is the time difference between signals $S_1$ and $S_2$ According to the embodiment of the process depicted on FIG. 5, the gasket 8 makes possible measurement of the stress applied to the bearing in two zones $A_1$, $A_2$ diametrically opposite and in the axis of establishment of the radial stress applied on the bearing. Radial component Fr and axial component Fa of the stress applied on the bearing are determined after analysis of the amplitudes of the signals emitted by the device detecting the stresses applied.

$$U_1 = f(Fa) \text{ and } U_2 = f(Fa + Fr)$$

Fa, modulus of the axial stress applied on the bearing,

Fr, modulus of the radial stress applied on the bearing.

Figure 6:
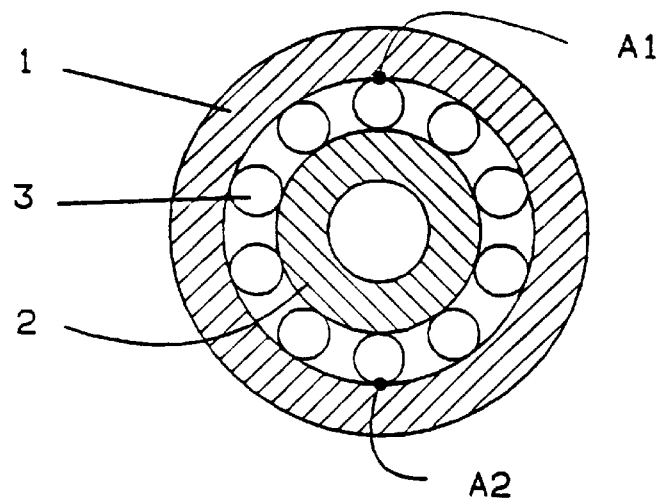
Figure 8:
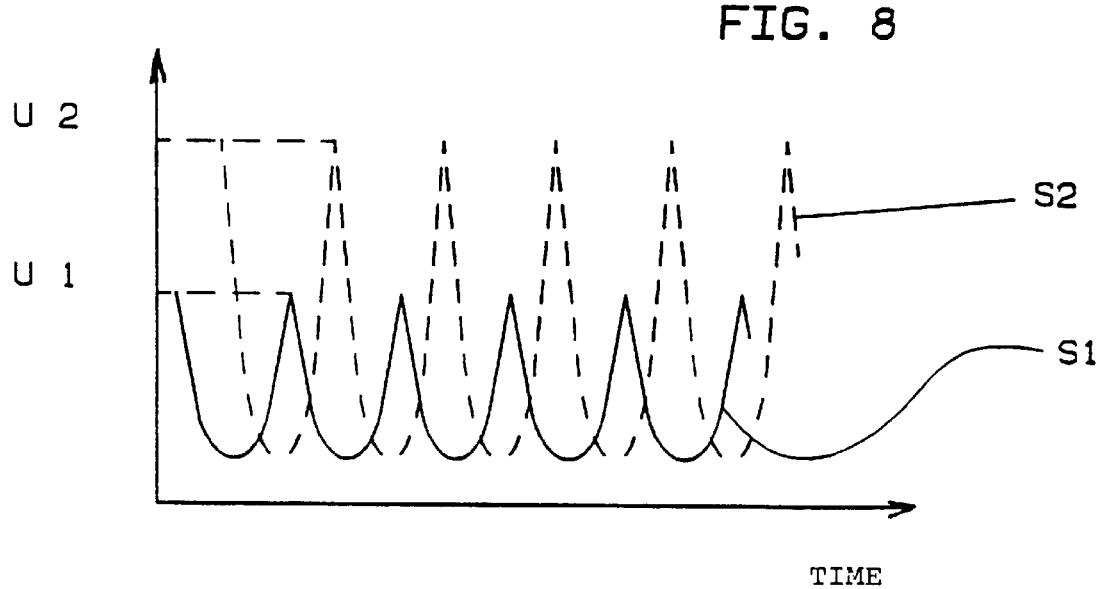

According to FIG. 6, the gasket makes possible detection of the stress applied to the bearing locally in two zones $A_1$, $A_2$ angularly spaced and indication of the direction of rotation of the bearing, following analysis of the phase difference dt of the signals emitted by the detector device.

The processing chain of signal S makes it possible also to follow the state of operation of the bearing and, in particular, to prevent damage to that bearing.

The device makes it possible to follow the variations of the spectrum of frequencies contained in electric signal S. The elevated frequency peaks are characteristic of the noise created by passage of the rolling bodies in a deteriorated zone of the bearing race.

Without departing from the scope of the invention, it is also possible to apply the aforesaid constructive measures to sealing devices, such as a bearing grease retention deflector.

According to the different modes of application of the device, representative signals of the stress components are compared to a given value of said signal and the variations and characteristics of said signals are detected in order to define the working parameters of the bearing, such as its speed, its direction of rotation and its axial and/or radial force.

Furthermore, the device makes it possible to verify proper operation of the bearing.

What is claimed is:

1. A bearing having a dynamometric detector device, comprising:

a bearing comprising a stationary ring, a frame, and a gasket supported by said frame, wherein said frame comprises a cylindrical element mounted to said stationary ring and a radial element supporting said gasket, and wherein a bearing stress is transmitted to said frame; and a stress detector mounted to said frame.

2. The detector device according to claim 1, wherein the stress detector is mounted at a deformable elastic zone of the frame.

3. The detector device according to claim 1, wherein the stress detector comprises a film sensor.

4. A process of dynamometric detection in a bearing having a dynamometric detector device comprising a bearing comprising a stationary ring, a frame, and a gasket supported by said frame, wherein said frame comprises a cylindrical element mounted to said stationary ring and a radial element supporting said gasket, and wherein a bearing stress is transmitted to said frame, and stress detectors mounted to two zones of said frame, comprising the steps of:

measuring the stresses applied in the two zones of the frame and according to a radial direction of establishment of said stress the radial and/or axial components of said stresses, and detecting variations of the representative signals of said stress components.

5. The process of detection according to claim 4, further comprising the steps of comparing the representative signals of said stress components to a given value of said signal and determining working parameters of the bearing, wherein the working parameters include:

a) a direction of rotation of the bearing, determined from the phase difference of the signals emitted in the two stress detection zones, b) a speed of the bearing, determined from analysis of the frequency spectrum of said signals, and c) an operating defect of the bearing, determined from variations of the frequency spectrum.

* * * * *